US009543803B2

(12) United States Patent
Høj et al.

(10) Patent No.: US 9,543,803 B2
(45) Date of Patent: Jan. 10, 2017

(54) HEAT CIRCULATION PUMP

(75) Inventors: Finn Mathiesen Høj, Aarhus N (DK); Thomas Blad, Bjerringbro (DK)

(73) Assignee: GRUNDFOS MANAGEMENT A/S, Bjerringbro (DK)

( * ) Notice: Subject to any disclaimer, the term of this patent is extended or adjusted under 35 U.S.C. 154(b) by 492 days.

(21) Appl. No.: 14/004,607

(22) PCT Filed: Feb. 24, 2012

(86) PCT No.: PCT/EP2012/053221
§ 371 (c)(1),
(2), (4) Date: Oct. 15, 2013

(87) PCT Pub. No.: WO2012/123236
PCT Pub. Date: Sep. 20, 2012

(65) Prior Publication Data
US 2014/0030124 A1    Jan. 30, 2014

(30) Foreign Application Priority Data
Mar. 12, 2011   (EP) .................................... 11002072

(51) Int. Cl.
*H02K 5/22*       (2006.01)
*F04D 13/06*      (2006.01)
(Continued)

(52) U.S. Cl.
CPC ............... *H02K 5/225* (2013.01); *F04D 13/06* (2013.01); *F04D 13/0606* (2013.01);
(Continued)

(58) Field of Classification Search
CPC .... F04D 13/06; F04D 13/0606; F04D 29/026;
F04D 29/40; F04D 29/403; F04D 29/406;
F04D 29/426; F04D 13/0693; H02K 5/02;
H02K 5/22; H02K 5/225
(Continued)

(56) References Cited

U.S. PATENT DOCUMENTS

| 6,896,494 B2 * | 5/2005 | Sunaga et al. ........ F04D 29/588 310/64 |
| 2010/0090635 A1 * | 4/2010 | Andersen et al. .... F04D 29/426 318/490 |
| 2011/0031830 A1 * | 2/2011 | Oleson et al. .......... F04D 13/06 310/88 |

FOREIGN PATENT DOCUMENTS

| DE | 44 18 166 A1 | 11/1995 |
| DE | 10 2004 030 721 B3 | 10/2005 |

(Continued)

*Primary Examiner* — Devon Kramer
*Assistant Examiner* — Chirag Jariwala
(74) *Attorney, Agent, or Firm* — McGlew and Tuttle, P.C.

(57) ABSTRACT

A heat circulation pump includes a pump housing (1) with a pump impeller driven by an electric motor. The electric motor is arranged in a motor housing (8) connected to the pump housing (1). A plastic terminal box (12) is fixed to the motor housing (8) and houses electric and/or electronic components of the engine control and electrically connects the motor, a ground contact arranged on the motor housing (8), and a plug or a socket (34) arranged on the outside of the terminal box (12). The ground contact arranged on the motor housing is connected in an electrically conductive manner to a ground contact of the plug or socket (34) and to at least one conductor inside the terminal box (12). The electric connection between the ground contact arranged on the motor housing (8) and the ground contact of the plug or socket (34) is arranged outside of the terminal box (12).

18 Claims, 7 Drawing Sheets

(51) Int. Cl.
  *F04D 29/02*  (2006.01)
  *F04D 29/42*  (2006.01)
  *H02K 5/128*  (2006.01)
  *H02K 7/14*  (2006.01)
  *H02K 5/10*  (2006.01)
  *F04D 29/58*  (2006.01)

(52) U.S. Cl.
  CPC ..... *F04D 13/0686* (2013.01); *F04D 13/0693* (2013.01); *F04D 29/026* (2013.01); *F04D 29/426* (2013.01); *F04D 29/5893* (2013.01); *H02K 5/10* (2013.01); *H02K 5/128* (2013.01); *H02K 7/14* (2013.01); *H02K 11/33* (2016.01); *F05D 2300/10* (2013.01); *F05D 2300/43* (2013.01)

(58) Field of Classification Search
  USPC ....... 310/68 R, 71; 417/423.1, 423.14, 423.7
  See application file for complete search history.

(56) References Cited

FOREIGN PATENT DOCUMENTS

| | | |
|---|---|---|
| DE | 10 2007 022 070 A1 | 11/2008 |
| EP | 1 437 819 A1 | 7/2004 |
| EP | 2 072 828 A1 | 6/2009 |
| EP | 2 166 230 A1 | 3/2010 |
| WO | 2008/019818 A1 | 2/2008 |

\* cited by examiner

Fig.8

HEAT CIRCULATION PUMP

CROSS REFERENCE TO RELATED APPLICATIONS

This application is a United States National Phase Application of International Application PCT/EP2012/053221 filed Feb. 24, 2012 and claims the benefit of priority under 35 U.S.C. §119 of European Patent Application EP 11002072.4 filed Mar. 12, 2011, the entire contents of which are incorporated herein by reference.

FIELD OF THE INVENTION

The invention relates to a heating circulation pump with a pump housing, with a pump impeller arranged therein and which is driven by an electric motor arranged in a motor housing connected to the pump housing. A terminal box of plastic is fastened on the motor housing and is for receiving electrical and/or electronic components of the motor control as well as for the electrical connection of the motor, with an earthing (ground) contact arranged on the motor housing and with a plug or socket of an electric plug-in connection for the electric connection. The plug or socket is arranged at the outside on the terminal box.

BACKGROUND OF THE INVENTION

Such heating circulation pumps are counted as belonging to the state of the art. They typically comprise a pump housing with a suction nozzle and a pressure nozzle as well as a pump impeller arranged therein. An electric motor whose shaft carries the pump impeller is provided for the drive of the pump. The stator surrounding the rotor is arranged in a housing which at its side facing the pump housing comprises a flange or similar connection element, via which the motor housing and in particular the stator housing is connected to the pump housing. A terminal box which is arranged at the axial side of the stator housing which is away from the pump housing is provided for the electric connection of the motor. The terminal box typically also comprises the motor electronics, thus for example a frequency converter. A heating pump of the above-mentioned type is known for example from DE 10 2004 030 721 B3.

SUMMARY OF THE INVENTION

Such heating circulation pumps of a small or medium construction type are produced in large-scale manufacture, which is why even the smallest improvements can entail significant savings with regard to manufacture and/or assembly. On the one hand one always strives to technically further improve these pumps and to design them in a more reliable manner, but on the other hand to reduce the manufacturing and assembly costs.

The heating circulation pump according to the invention comprises a pump housing with a pump impeller which is arranged therein and which is driven by an electric motor arranged in a motor housing connected to the pump housing. A terminal box of plastic which is provided and designed for receiving electrical and/or electronic components of the motor control as well as for the electric connection of the motor is arranged on the motor housing. An earthing (ground) contact is also arranged on the motor housing. A plug or socket of an electric plug-in connection which is provided for the electric connection of the motor or of the motor electronics connected in series is provided on the terminal box at the outside. Thereby, the earthing contact on the motor housing is connected in an electrically conductive manner to an earthing contact of the plug or of the socket as well as to at least one lead in the inside of the terminal box. According to the invention, the electrical connection between the earthing contact arranged on the motor housing and the earthing contact of the plug or socket is arranged outside the terminal box.

The basic concept of the solution according to the invention is to arrange the electric connection between the motor-side earthing contact and the plug-side or socket-side earthing contact outside the terminal box, in order in this manner to permit the electrical connection between the earthing contact on the motor housing side and the plug-side or socket-side earthing contact to be able to be led outside the terminal box and at least outside the inside of the terminal box. Such an arrangement has the advantage that the thermal coupling between the motor housing and the terminal box via the earthing which is inherent of the state of the art can be largely avoided, which is particularly advantageous if the motor housing is comparatively warm or comparatively cold compared to the terminal box.

Thereby, it is particularly advantageous if the earthing contact of the plug or the socket is designed in a branched manner, wherein the branching lies outside the terminal box or within the terminal box wall. Then, although a connection of the earthing to at least one lead in the inside of the terminal box, typically on a circuit board located therein is effected, as was hitherto the case, the electrical connection to the plug or to the socket from the earthing contact of these is however led directly to the plug or the socket which are integrally formed on the terminal box and envisaged for the electrical connection, quasi whilst avoiding the terminal box. On account of the solution according to the invention, one succeeds in the terminal box, in particular the heat-sensitive components arranged therein, being subjected to a lower thermal loading, since the thermal conduction divides between the motor housing which leads away the waste heat arising in the motor, in as much as it is effected via the earthing contact, so that only a part of the heat led via the earthing contact is led into the terminal box, and with a suitable design a greater part of this heat is led directly to the plug or socket whilst avoiding the terminal box. Although the earthing lead of the connection cable is thermally loaded to a greater extent than with known solutions due to this leading of the heat, this however is not a problem, since the heat as a rule can be dissipated via the lead length. The heat which is introduced into the terminal box from the motor housing via the earthing contact however is significantly lower than with known designs, since a branching of the heat flows also occurs due to the branching outside the terminal box or within the terminal box wall, so that a greater part of the heat led via the earthing contact does not get into the terminal box at all given a suitable design.

A further advantage of the solution according to the invention is not only given with heat arising on the part of the motor, but also vice versa with cold arising there, as can be the case with a coolant pump for example. Now due to the design according to the invention, one succeeds in the terminal box interior not being cooled via this earthing contact, which can lead to a formation of condensation water and damage to the electronics.

If the branching lies in the terminal box wall, this is advantageously provided in a side wall or in the base of the terminal box.

According to the invention, one envisages the part of the contact leading into the inside of the terminal box having a smaller cross section than the part leading to the plug or to the socket, in order to keep the flow of heat into the terminal box through the earthing contact as low as possible. According to the cross-sectional dimensions, a division of the heat flows also occurs, so that given a suitable dimensioning, a large part of the heat flow released from the motor housing to the earthing contact does not get into the terminal box but past this to the plug or the socket and there can be led away to the connection cable and to the outer environment.

Advantageously, the earthing contact is designed and arranged such that it is branched into two contact legs, of which one leg engages into the motor housing and the other leg is arranged on the outer side of the motor housing at a distance to this and forms part of the plug or of the socket. With such an arrangement, the branching outside the terminal box wall can be provided in a large-surfaced manner, which is particularly favorable with regard to thermal technology.

Advantageously, the contact, in particular the earthing contact is designed as a sheet-metal part which is formed by punching. Such contacts are manufacturable in an inexpensive manner.

Two or more contacts which are electrically insulated to one another are provided in the plug or in the socket for the connection of the motor. These according to a further development of the invention are constructionally identical to the earthing contact and arranged at a distance to one another and to the earthing contact, wherein the non-earthing contacts also to the motor housing are embedded in plastic which forms a part of the terminal box and/or of the plug or socket. Such a design is particularly advantageous since the same components can be used for the earthing contact as well as for the remaining contacts, which significantly reduces the variety of parts on manufacture and handing, in particular on leading the parts.

Thereby, it is particularly advantageous if the earthing contact on the motor side engages in a projection or prominence which projects with respect to the remaining wall of the motor housing. Then specifically sufficient free space is present next to this projection, in which free space the remaining contacts with their contacts embedded there in plastic have the required installation space.

It is particularly advantageous if the earthing contact transversely to the insertion direction is designed in a widened manner at least on one side and has a material recess at least at the height of the widened region or also beyond this. A particularly intensive contacting with the motor housing can be created by way of this. Then the recess on the motor housing side, in particular in the projection of the wall of the motor housing can be designed in a straight manner in the insert or plug-in direction of the contact, which in particular is advantageous with metallic housings which are manufactured with casting technology. The contacting by way of this is effected intensively such that the widening is larger than the clearance of the motor-side recess, thus such that the earthing contact in this region is deformed at least elastically and possibly also plastically. A material recess at the height of the widening or beyond this is provided, for example by way of a slot or likewise, in order to ensure sufficient free space for receiving the material deformation. A secure contacting between the earthling contact and the motor housing is ensured in this manner, without additional construction effort being effected with regard to manufacturing technology.

It is particularly advantageous with the application of permanent magnet motors running at high speed, if the terminal box connects on the axial side of the motor housing which is away from the pump housing, since then one can create sufficient space for receiving the motor electronics and specifically essentially independently of the radial and axial extension of the motor, in particular of the stator. With such an axial arrangement of the terminal box, i.e. if the terminal box is arranged on the side of the motor housing which is away from the pump seen in the axial direction of the motor shaft, it is then advantageous to arrange the plug or the socket for the connection on the radial outer side of the motor housing and/or of the terminal box. With the above-mentioned motor construction type, the motor is often design in a slim manner compared to the pump. The pump also comprises suction and pressure nozzle which entail the creation of lateral free spaces which are often not used. It is therefore advantageous to arrange the plug or the socket in this region, since this does not increase the axial construction length of the pump and utilizes spatial regions which are given in any case and which are otherwise not useable. Thereby, it is particularly advantageous to arrange the plug or the socket in a manner displaced to the terminal box, preferably next to the motor housing, and specifically such that the plug direction is parallel to the rotation axis of the motor and pump. This arrangement also has the advantage that no additional free space is required for sticking on the counter-plug or counter-socket, in any case only little radial free space next to the heating circulation pump, which remains free and is unused in any case in practice.

Thereby, it is advantageous to not only design the electrical connections between the terminal box and the motor or between the plug and/or socket and the connection cable as a plug-in connection, but moreover also the mechanical connection between the terminal box and the motor and/or pump housing. This can be effected by way of at least one snap connection being provided between these components, wherein the joining direction of the snap connection corresponds to the joining direction of the earthing contact. The terminal box can be stuck on without any tools due to this design according to the invention, wherein simultaneously all necessary electrical connections between the motor and terminal box are closed with this sticking-on. Such an arrangement is particularly advantageous with large-scale manufacture, since it simplifies and cheapens the assembly.

The terminal box is advantageously designed such that it is hermetically sealed with respect to the surroundings and also with respect to the motor. Thereby, the sealing with respect to electrical contacts to be led out is usefully effected by way of moulding these contacts into the terminal box wall.

Since the terminal box must receive the electrical or electronic components before the hermetic closure, it is useful to construct this terminal box from two components in the manner of a conventional terminal box, thus for example of a terminal box basis body with a cover. These then according to an advantageous further development of the invention are formed from thermoplastic plastic and are connected to one another by way of welding. A completely closed terminal box which is encapsulated hermetically to the outside arises by way of this. The welding thereby can be effected by way of laser welding, if for example the cover is formed from a material which is transparent to the laser beam and the basis body is formed of a material which is not transparent to the laser beam. The welding seam can then be formed through the cover in the separating gap between the cover and the basis body by way of the material there being melted by the laser beam, which is particularly favorable with regard to manufacturing technology.

The invention is hereinafter explained in more detail by way of embodiment examples represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
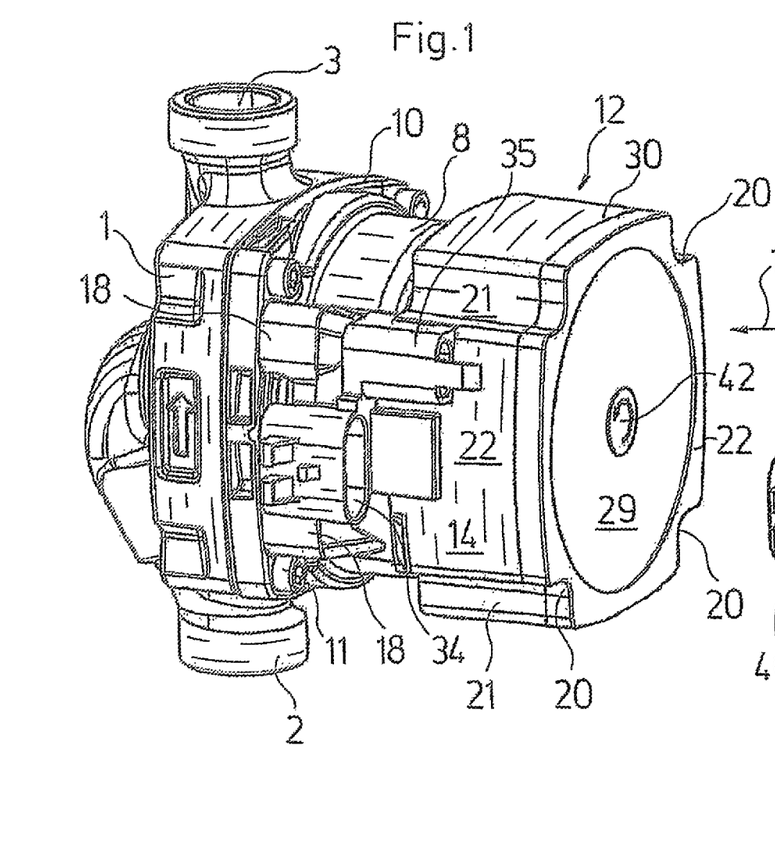
FIG. 1 is a simplified perspective representation of a heating circulation pump according to the invention.
Figure 3:
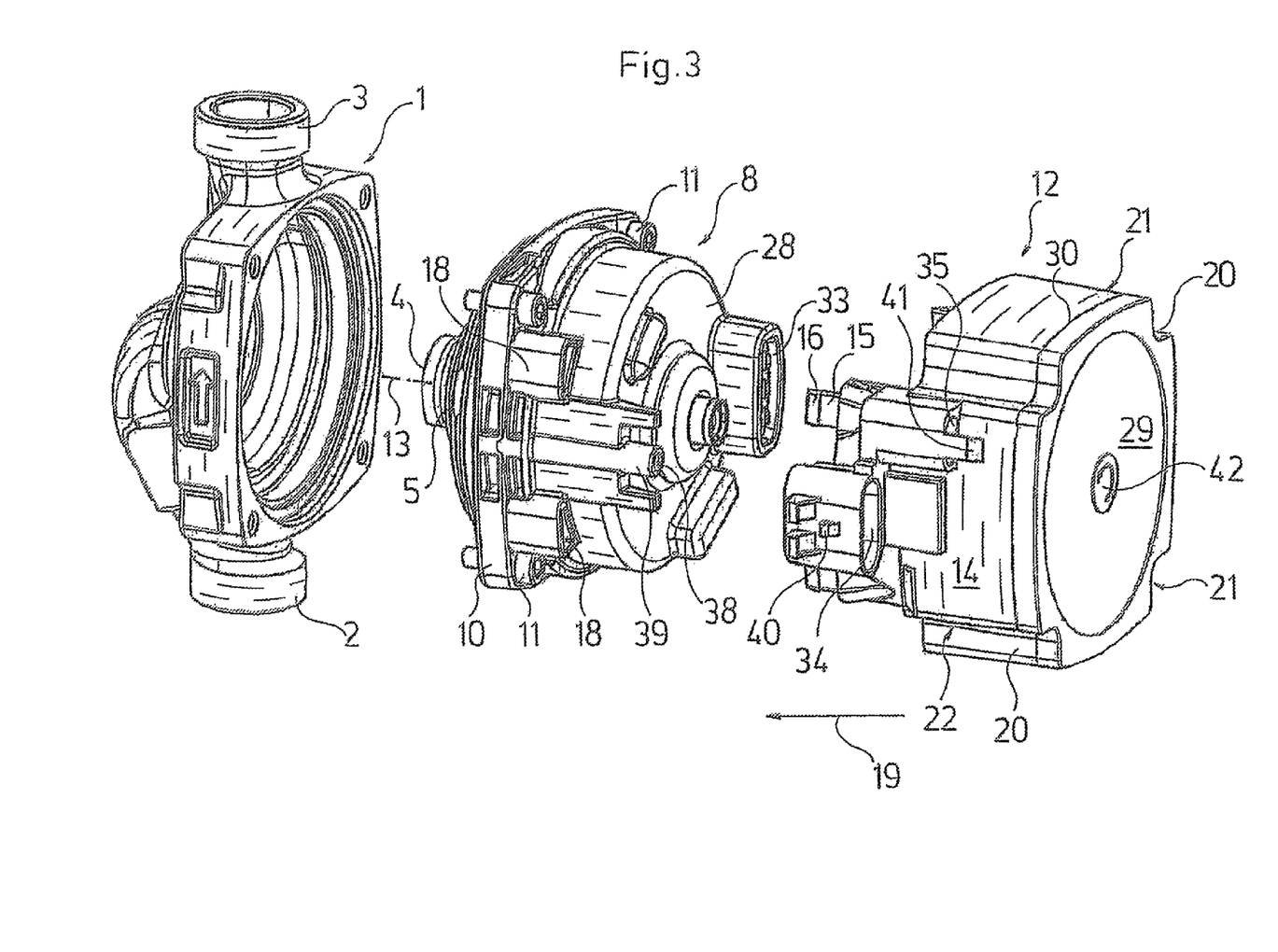
FIG. 3 is a perspective exploded representation of the pump, motor and terminal box.
Figure 8:
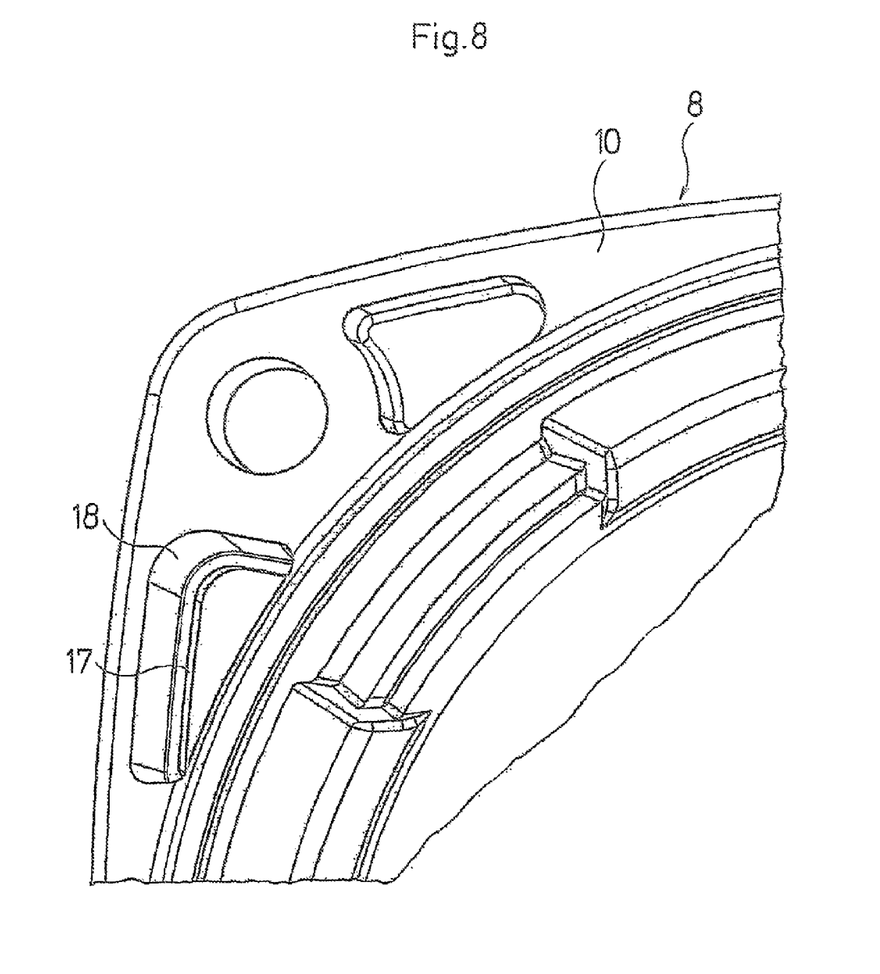
FIG. 8 is an enlarged representation of a view of the corner region of the motor housing flange, from the pump side.

Referring to the drawings in particular, the heating circulation pump represented by way of FIGS. 1, 3 and 8 comprises a centrifugal pump with a pump housing 1 with a suction nozzle 2 and with a pressure nozzle 3 with a channel guidance formed therebetween which leads the fluid coming from the suction nozzle 2 to a suction port 4 of a pump impeller 5 which is mounted within the pump housing 1 and whose driven side connects to a channel leading to the pressure nozzle 3.

The heating circulation pump moreover comprises a motor, here a wet-running motor, whose rotor 6 runs in a can 7 which is filled with fluid. The can 7 is surrounded by a stator, i.e. by the motor windings arranged around the can 7 on the peripheral side, as well as by a motor housing 8 receiving the stator. The rotor 6 comprises a central shaft 9 which extends to into the pump housing 1 and carries the pump impeller 5, so that the rotational movement of the rotor 6 is transmitted onto the pump impeller 5.

The motor housing 8 at its side facing the pump housing 1 comprises a flange 10, with which it is connected to the pump housing 1 and is sealingly and firmly connected to the pump housing 1 in the corner regions of the flange via four screws 11. In the shown embodiment, the pump housing 1 and the motor housing 8 consist of metal and are manufactured as cast components.

With regard to the heating circulation pumps represented here, the motor housing 8 is designed as metallic cast housing. For the present invention however, the housing can also be formed by a moulded stator, as is then the case if the stator winding is moulded into plastic. The motor housing can also be manufactured as an injection moulding part. It is to be understood that the earthing contact described in detail further below is then integrated separately within the plastic and is connected in an electrically conductive manner to the stator lamination bundle and the can of the motor which is then formed from metal.

The heating circulation pump furthermore comprises a terminal box 12 which consists of plastic, is attached on the axial side of the motor housing 8 which is away from the pump housing 1, and partly engages over the motor housing 8 to its axial side in a complete and radial manner, i.e. on the peripheral side.

The spatial terms axially and radially which have being used up to now and are used hereinafter relate to the rotation axis 13 of the rotor 6 or of the pump impeller 5. The axial sides are thus the sides which run essentially perpendicularly to the rotation axis 13, wherein radial surfaces are the surfaces which extend parallel to the rotation axis.

The motor housing 8 in the flange region comprises a rounded essentially square cross section, whereas the remaining part of the motor housing 8, thus the part connecting to the terminal box 12 has an essentially circularly round cross section and thus has a cylinder-surface-shaped peripheral surface. Whereas the pump housing 1 and the motor housing 8 are releasably connected to one another by way of four screws 11, the terminal box 12 consisting of plastic is fastened on the motor housing 1 by way of snap connections. For this, the terminal box 12 comprises four tongues 15 which extend out of the side walls 14 of the terminal box to the pump housing 1, at whose ends lateral snap projections 16 are arranged, which engage behind snap recesses 17 in the motor housing 8, said snap recesses being integrally formed on the motor housing 8 in the region of the flange 10. These snap recesses 17 are in each case formed by a step in a tubular guide 18 pointing from the flange 10 to the terminal box 12, on the motor housing (see FIG. 8).

The tongues 15 get into the guides 18 which are arranged aligned thereto, on applying the terminal box 12 onto the motor housing 8 in the axis direction, thus in the stick-on direction 19, wherein the snap projections 16 due to the transverse deflection of the tongues move laterally inwards on and past the steps forming the snap recesses 17 and after passing the snap engage outwards due to the elastic restoring of the tongues 15 and thus hold the terminal box 12 on the motor housing 8.

The terminal box 12, seen in the direction of the rotation axis 13, has an essentially rectangular outer contour and in the corner regions, thus in the region of imagined axial extensions of the screws 11, is designed in a recessed manner, so that the screws 11 are accessible to a tool applied from the axial direction when the terminal box 12 is applied. These corner regions are characterized at 20.

Horizontal edge regions 21 and vertical edge regions 22 of the terminal box 12 result with this shaping and with the represented vertical installed condition (suction nozzle 2 and pressure nozzle 3 lie vertically above one another).

Figure 2:
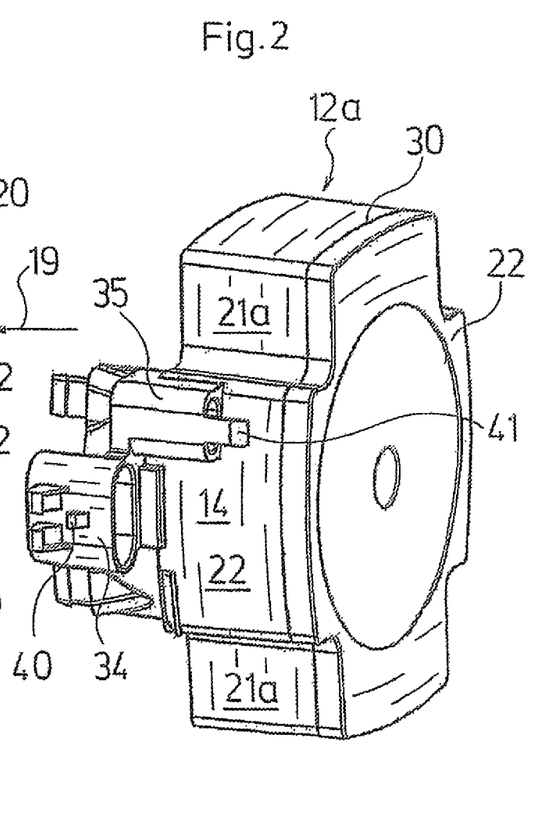
FIG. 2 is a simplified perspective representation according to FIG. 1 of a terminal box with radial widenings.

The vertical edge regions 22 with the represented embodiment are used for leading out electrical contacts, whereas the horizontal edge regions 21 are used for the arrangement of the electronic components within the terminal box. Since constructionally equivalent pumps can be equipped with electric motors with different motor electronics, then as is clear by way of comparing the representation according to FIGS. 1 and 2, when using different terminal boxes which differ only in the radial extension of the horizontal edge regions 21, the inner volume of the terminal box can be varied without having to change the electric connections, and specifically neither on the motor side nor on the terminal box side. The widened horizontal edge regions in FIG. 2 are characterized at 21a, the terminal box at 12a.

The electrical contacts are arranged in the vertical edge regions 22, and specifically, seen in the axis direction of the terminal box 12 in the direction to the pump housing 1, the contacts 23 leading to the motor winding are arranged in the right vertical edge region 12 and the contacts 24 led out to the plug-in connection from the electrical connection of the motor are arranged in the left vertical edge region 22. These contacts 23 and 24 are to be recognized in the sectioned representation according to FIG. 6. They are formed in each case of sheet metal, thus as punched parts and are designed the same in a grouped manner, i.e. all contacts 23 are constructionally identical to one another as well as all contacts 24 constructionally identical amongst one another.

Figure 4:
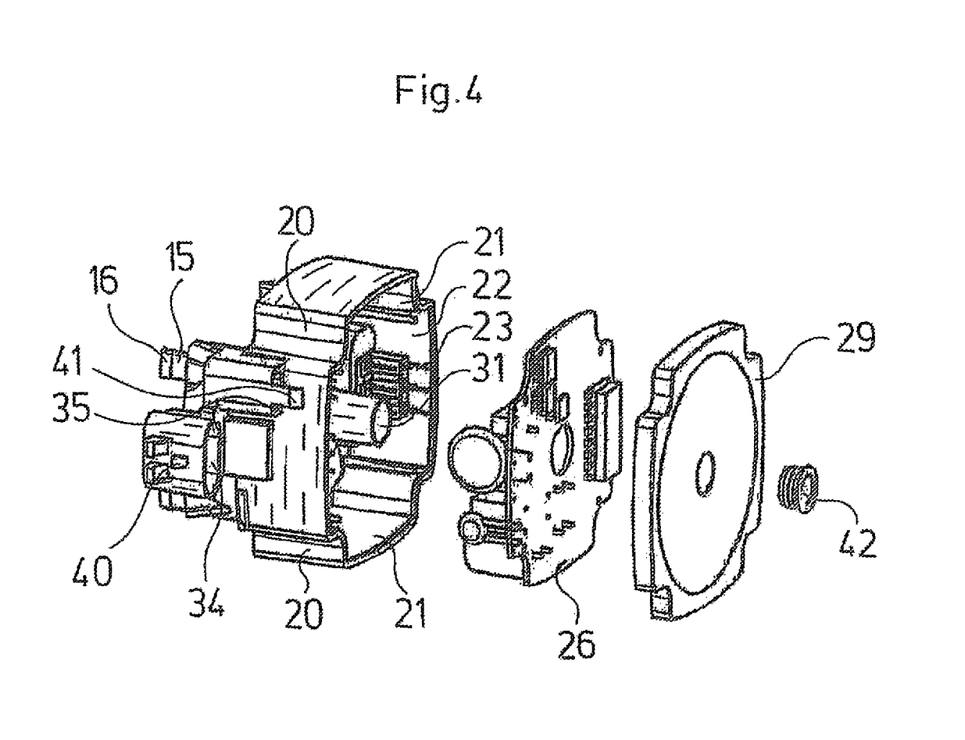
FIG. 4 is a perspective exploded representation of the terminal box according to FIG. 3 in its construction.
Figure 5:
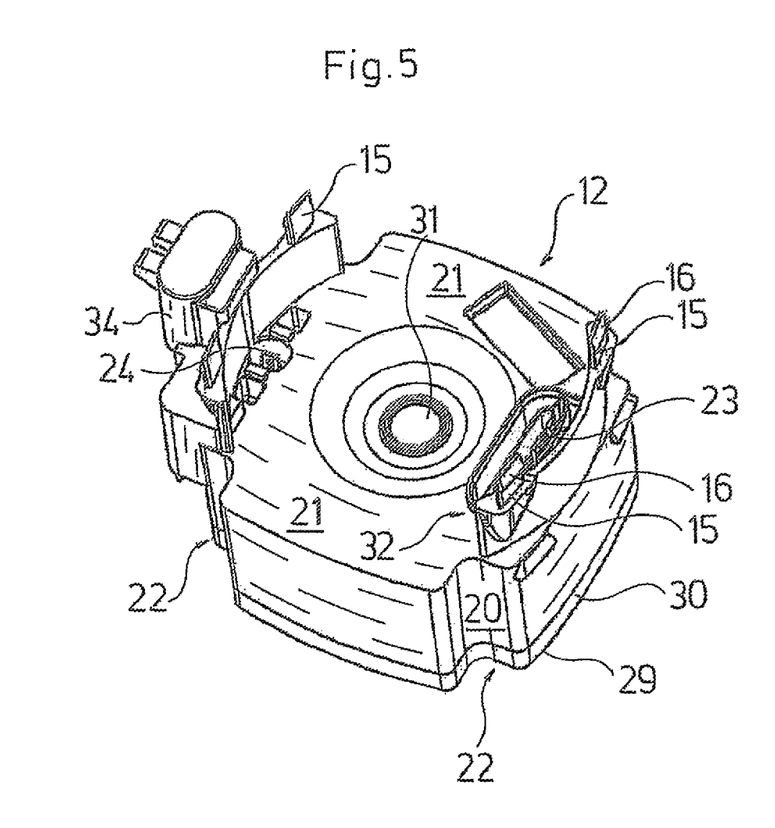
FIG. 5 is a perspective view of the terminal box from below.
Figure 6:
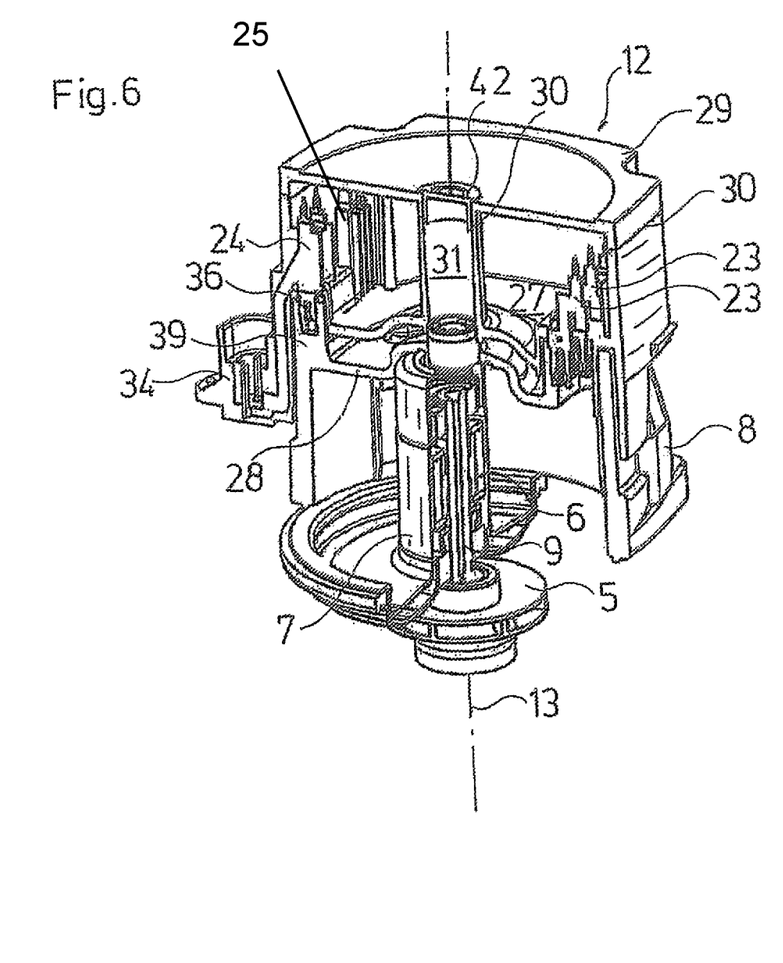
FIG. 6 is a perspective longitudinal sectional representation of the terminal box and motor with an applied pump impeller.

All contacts 23 and 24 as well as the further contacts 25 which are arranged on the left side in the vertical edge region 22 and which serve for the motor control, end in the terminal box 12 on a circuit board 26 which for reasons of a better overview is not shown in the representation according to FIG. 6, but can be seen in the exploded representation according to FIG. 4 and which carries the electrical and electronic components of the motor control, here in particular the frequency converter.

The contacts 23, 24 and 25 are compactly moulded into the terminal box 12 formed from thermoplastic plastic, and specifically the contacts 23 into the base 27 of the terminal box 12, and the contacts 24 and 25 into the base 27 or the side wall 14 which is adjacent thereto.

The base 27 of the terminal box 12 is designed in a completely closed manner and is designed distanced to the axial wall 28 of the motor housing 8 (see FIG. 6). The base 27 merges into the side walls 14 which are likewise closed, the axial end of the side walls 14 is closed off by a cover 29 which is likewise designed in a closed manner (closed with respect to the inside of the terminal box). The cover 29 is connected with a material fit by way of a peripheral welding seam 30 to the basis body of the terminal box 12 which consists of the base 27 and walls 14. In this manner, the inside of the terminal box is not only sealed but hermetically closed off, i.e. the sensitive electronics which are located therein are reliably protected from dust, water and gases.

The welding seam 30 is formed by way of laser welding from the cover side. For this, the cover 29 is manufactured of a material which is transparent to the laser beam, whereas the basis body, thus the base 27 and the side walls 14 are manufactured of a material which is essentially not transparent to the laser beam. The welding is effected in a manner such that the laser beam is directed from the cover side onto the face sides of the side walls 14 which face the cover. Thereby, the laser beam gets through the cover 29 which is transparent to the laser beam, up to the face sides of the side walls 14, where it melts the material which due to the effect of heat also melts with the cover material and in this manner forms a hermetic weld connection between the side walls 14 and the cover 29, by which means the terminal box 12 is closed off to the outside in a hermetically sealed manner. Thereby, the welding is not only effected in the region of the outer lying walls 14 but also in the region of the central recess 31, thus at a side which is otherwise extremely poorly accessible for the welding.

A central recess 31 runs through the terminal box 12 and in the axial direction, is closed off by a plug 42 and is not connected to the inside of the terminal box. This recess 31 leads to an opening in the axial wall 28 of the motor housing 8, said opening likewise being closed by a screw and via which the free end of the shaft 9 is accessible, in order given a blockage of the rotor 6, to be able to freely rotate this by hand. The screw closing this opening is designed as a type of grub screw with a hexagon socket, wherein the hexagon socket receiver is designed such that the screw remains on the tool on removal, so that this screw can be removed and then the shaft 9 can be rotated by way of a further tool, on removing the plug 42 by way of a key. The openings are then closed again in the reverse sequence. The recess 31 thus passes through the terminal box 12 in the axial direction, so that a hermetically closed annular space results in the terminal box 12.

In as much as it relates to the contacts 23 for connection to the motor winding, these are recessed in the manner of a socket 32 into the base of the terminal box 12, and specifically in the right vertical edge region 22. A plug 33 projecting axially on the axial wall 28 to the terminal box 12 is formed on the motor housing 8 and this plug on sticking the terminal box 12 onto the motor housing 8 is connected to the socket 32, by way of which the electric connection between the terminal box 12 and the motor winding is created.

Figure 7:
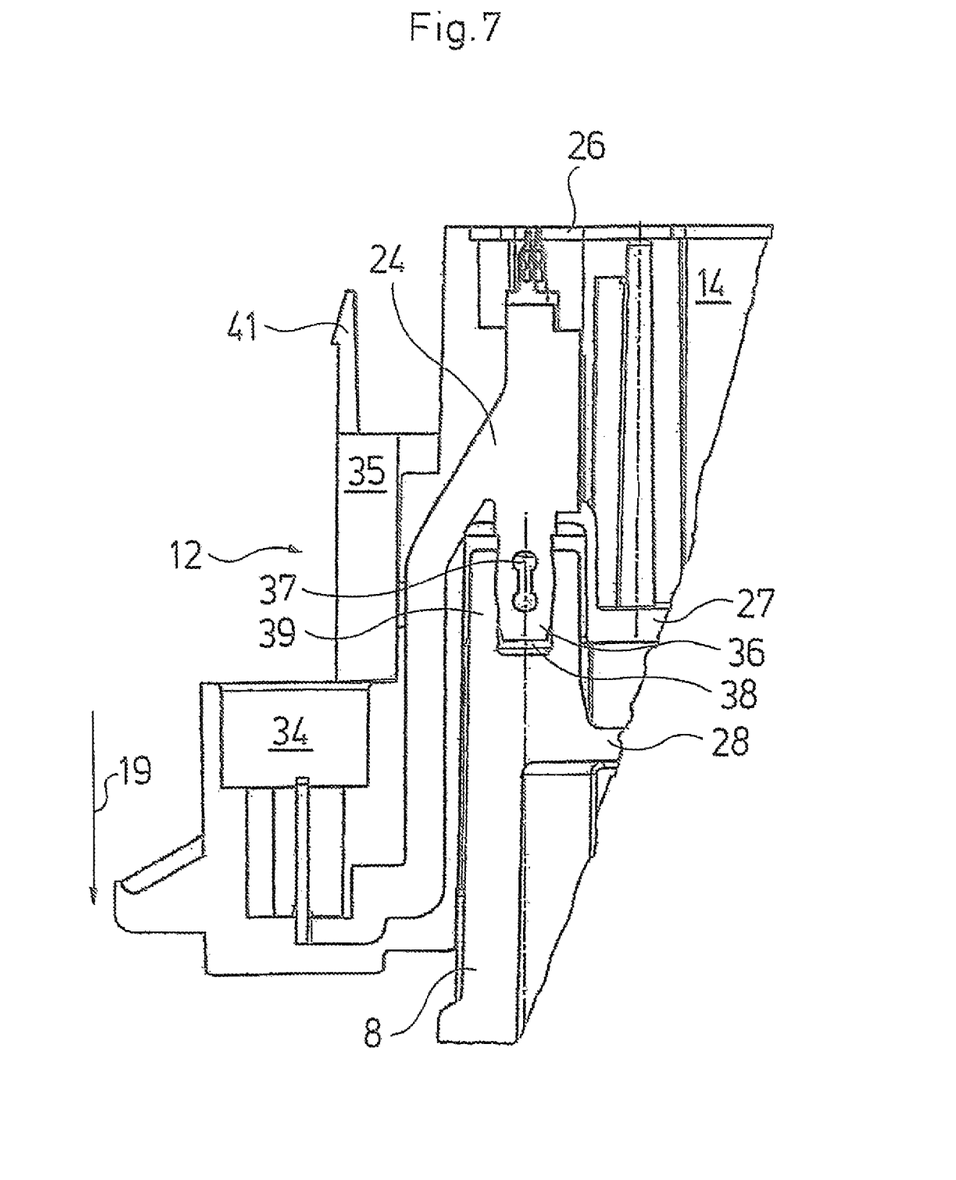
FIG. 7 is an enlarged representation of a longitudinal section in the region of earthing contact between the terminal box and the motor.

The contacts 24 with one leg are led to a socket 34 and the contacts 25 to a socket 35, on the oppositely lying left side of the vertical edge region 22 of the terminal box 12. One of the contacts 24, specifically the contact represented in FIG. 7, is an earthing contact and serves for connecting the metallic motor housing 8 to the corresponding earthing connection of the socket 34 or to the corresponding earthing connection on the circuit board 26 within the terminal box 12. For this, the contact 24 on one leg comprises a plug-in part 36 which has a slightly cambered shape in the plane of the sheet metal as well as a central longitudinal recess 37 in the plug-in direction of the plug-in part 36. A socket-like recess 38 in an axial prominence 39 on the axial wall 28 of the motor housing 8 is provided in a manner aligned to the plug-in part 36 of the earthing contact. The cross-sectional dimension of the recess 38 is slightly smaller than the transverse extension of the plug-in part 36 in the cambered region, so that the plug-in part 36 is deformed at least elastically, possibly also plastically, on inserting the plug-in part 36 into the recess 38, by which means an intimate contact between the plug-in part 36 and the recess 38 in the motor housing 8 and thus a reliable earthing is ensured. The recess 37 is provided so that the plug-in part 36 can also plastically deform as the case may be.

The non-earthing contacts which with regard to the shaping are designed identically to the earthing contact 24, likewise comprise a plug-in part 36 with a recess 37, but plastic is peripherally moulded around them and a free space is here in the motor side, since the prominence 39 is provided quasi pointwise only in the region of the plug-in part 36 of the earthing contact.

The contacts 24 and thus in particular also the earthing contact which has an intimate connection to the motor housing 8, is designed in a branched manner into two legs, in the base 27 or in the side wall 14 (see FIG. 7) and runs obliquely out of the terminal box towards the pump housing 1, parallel and along the outer periphery of the motor housing 8, but ends at a distance in front of the flange 10 of the motor and is angled by 180° where the contacts 24 together form the socket 34 servings for receiving a connection plug at the end of a cable of an electrical supply lead. The housing of the socket 34 is designed as one piece with the terminal box 12. The socket 34 is arranged in a manner displaced to the terminal box 12, next to the motor housing 8 on the outer periphery of this. A plug engaging into this socket 34 is insertable in the axial direction, and specifically in the direction to the pump housing 1 and then lies next to the terminal box 12, and specifically next to the left vertical edge region 22. The socket 34 comprises a snap projection 40 which is part of a snap connection whose other part is provided on the counter-piece, thus the plug.

The socket 35 which receives the contacts 25 is led out of the terminal box in a similar manner, but through the side wall 14. The socket 35 formed there in the representation according to FIG. 3 bears on the left vertical edge region 22 on the outer periphery of the terminal box 12, but however differently to the socket 34 is not arranged displaced to the motor housing 8, but lies directly next to the terminal box 12. There, the socket 35 comprises a snap projection 41 which secures the plug engaging into this socket, from detachment. The sockets 34 and 35 as is the case with the socket 32 are manufactured as one piece with the terminal box 12 with plastic injection moulding method, thus by way of peripherally moulding around the contacts 23, 24, 25 on manufacture of the terminal box basis body.

The sockets 34 and 35 are designed as flat sockets in a manner such that their contacts 24 and 25 respectively are in each case located next to one another in a plane arranged essentially parallel to the motor housing 8. The radial construction space next to the motor housing 8 or terminal box 12 is comparatively small due to this arrangement.

If the motor housing is not designed as a metallic cast housing, but as a plastic housing or as a cast mass surrounding the stator, then the recess 38 in the prominence of the motor housing is provided with a contact, for example formed by a hollow-cylindrical metallic socket which is electrically conductively connected to the stator lamination bundle and the metallic can 7, in order to ensure the electrical safety of the heating circulation pump for the case that one of these components becomes live due to a stator defect.

While specific embodiments of the invention have been shown and described in detail to illustrate the application of the principles of the invention, it will be understood that the invention may be embodied otherwise without departing from such principles.

The invention claimed is:

1. A heating circulation pump comprising:
   an electric motor;
   a pump housing;
   a motor housing connected to the pump housing;
   a pump impeller arranged in the pump housing and driven by the electric motor arranged in the motor housing; and
   a terminal box formed of plastic and fastened on the motor housing, wherein the terminal box receives electrical and/or electronic components of a motor control as well as an electrical connection of the motor, with an earthing contact arranged on the motor housing and with a plug or socket of an electric plug-in connection for the electrical connection, said plug or socket being arranged at an outside on the terminal box, wherein the earthing contact arranged on the motor housing is connected in an electrically conductive manner to an earthing contact of the plug or of the socket as well as to at least one lead in an inside of the terminal box, the electrical connection for the earthing contact arranged on the motor housing and the earthing contact of the plug or of the socket is arranged outside the terminal box, and wherein the earthing contact of the plug or of the socket is branched into two contact legs, of which one leg engages into the motor housing, and the other leg is arranged on an outer side of the motor housing at a distance thereto, said motor housing comprising a first projection and a second projection, said first projection and said second projection defining a leg receiving space, at least a portion of said one leg being arranged in said leg receiving space, said at least said portion of said one leg engaging said first projection and said second projection, said at least said portion of said one leg being located at a spaced location from an interior of said terminal box.

2. The heating circulation pump according to claim 1, wherein the terminal box is connected to the motor housing and/or pump housing via at least one snap connection, wherein a joining direction of the snap connection corresponds to a joining direction of the earthing contact of the plug or of the socket.

3. The heating circulation pump according to claim 1, wherein the terminal box is designed in a hermetically closed manner to the motor and to the surroundings.

4. The heating circulation pump according to claim 1, wherein a part of the earthing contact of the plug or of the socket which leads into the inside of the terminal box has a smaller cross section than a part of the earthing contact of the plug or of the socket leading to the plug or to the socket.

5. The heating circulation pump according to claim 1, wherein the terminal box comprises two thermoplastic components connected to the terminal box in a hermetically closed-off manner by way of welding.

6. The heating circulation pump according to claim 1, wherein the earthing contact of the plug or of the socket is designed as a sheet metal part.

7. The heating circulation pump according to claim 1, wherein the terminal box comprises two or more contacts which are electrically insulated relative to one another, are constructionally identical and are arranged at a distance to one another, wherein non-earthing contacts of the two or more contacts towards the motor housing are also embedded in plastic and are also forming part of the terminal box and/or of the plug or of the socket.

8. The heating circulation pump according to claim 1, wherein said first projection and said second projection are raised with respect to a wall of the motor housing.

9. The heating circulation pump according to claim 1, wherein the earthing contact of the plug or of the socket transversely to an insert direction is designed in a widened manner at least on one side, and has a material recess at a height of the widened region.

10. The heating circulation pump according to claim 1, wherein the terminal box connects on an axial side of the motor housing which is away from the pump housing, and the plug or the socket is arranged on a radial outer side of the motor housing and/or of the terminal box.

11. The heating circulation pump according to claim 1, wherein the plug or the socket is arranged in a manner displaced to the terminal box, preferably next to the motor housing, such that the plug-in direction is parallel to the rotation axis of the motor and pump.

12. The heating circulation pump according to claim 1, wherein said at least said portion of said one leg lies outside the terminal box or within a wall of the terminal box.

13. The heating circulation pump according to claim 12, wherein said at least said portion of said one leg is provided in a side wall or in a base of the terminal box.

14. A heating circulation pump comprising:
   an electric motor;
   a pump housing;

a motor housing connected to the pump housing, the electric motor being arranged in the motor housing;

a pump impeller arranged in the pump housing and driven by the electric motor;

a terminal box formed of plastic and fastened on the motor housing, the terminal box receiving electrical and/or electronic components of a motor control; and an electrical connection of the motor, the electrical connection comprising a ground contact arranged on the motor housing and an electric plug-in connection for the electrical connection comprising plug or socket arranged at an outside of the terminal box, wherein the electrical connection of the motor comprises a connection of the ground contact arranged on the motor housing in an electrically conductive manner to a ground contact of the plug or of the socket and to a lead in an inside of the terminal box, wherein the electrical connection for the ground contact arranged on the motor housing and the electric plug-in connection ground contact is arranged external to the terminal box, wherein the electrical connection for the ground contact arranged on the motor housing and the electric plug-in connection ground contact is arranged at a spaced location from an interior of the terminal box, and wherein the electric plug-in connection ground contact is branched into two contact legs, of which one leg engages into the motor housing, and the other leg is arranged on the outer side of the motor housing at a distance thereto, said motor housing comprising a first projection and a second projection, said first projection and said second projection defining a leg receiving space, at least a portion of said one leg being arranged in said leg receiving space, said at least said portion of said one leg being in contact with said first projection and said second projection, said at least said portion of said one leg being located at a spaced location from said interior of said terminal box.

15. The heating circulation pump according to claim 14, wherein the terminal box comprises two or more contacts which are electrically insulated relative to one another, are identical or substantially identical in construction and are arranged at a distance to one another, wherein non-ground contacts of the two or more contacts in a direction of the motor housing are also embedded in plastic and are also forming part of the terminal box and/or of the plug or of the socket.

16. The heating circulation pump according to claim 14, wherein the electric plug-in connection ground contact defines a branching that lies outside the terminal box or within a terminal box side wall or base wall.

17. The heating circulation pump according to claim 14, wherein a part of the electric plug-in connection ground contact which leads into the inside of the terminal box has a smaller cross section than a part of the electric plug-in connection ground contact leading to the plug or to the socket.

18. The heating circulation pump according to claim 14, wherein the electric plug-in connection ground contact comprises a sheet metal part.

\* \* \* \* \*